June 6, 1961     E. C. KIEKHAEFER     2,987,158
CENTRIFUGAL CLUTCH
Original Filed Sept. 14, 1953     2 Sheets-Sheet 1
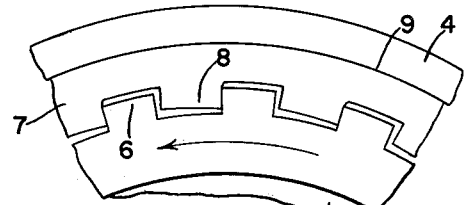
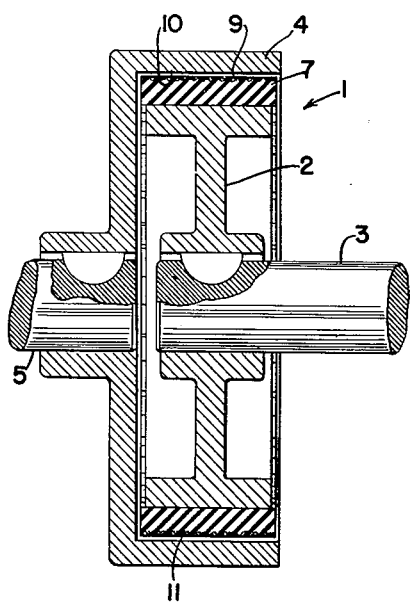
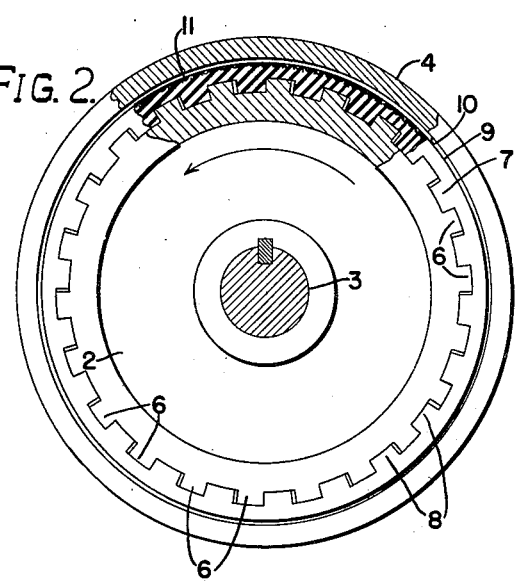
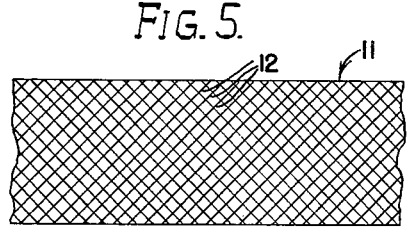
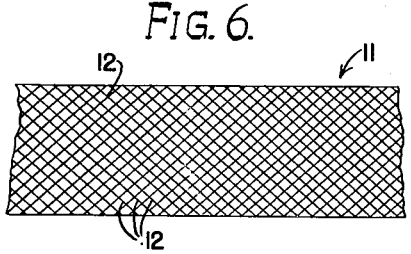
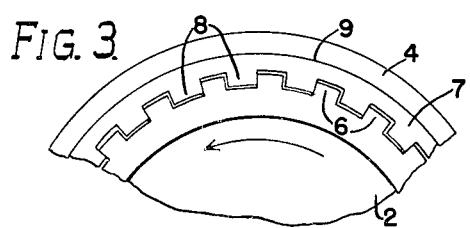
INVENTOR.
ELMER C. KIEKHAEFER
BY
ATTORNEYS

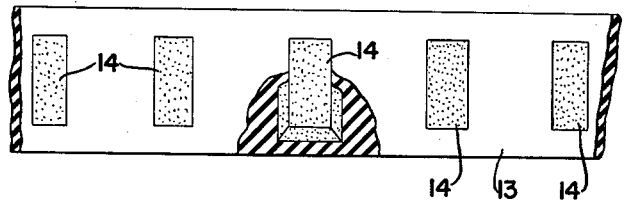
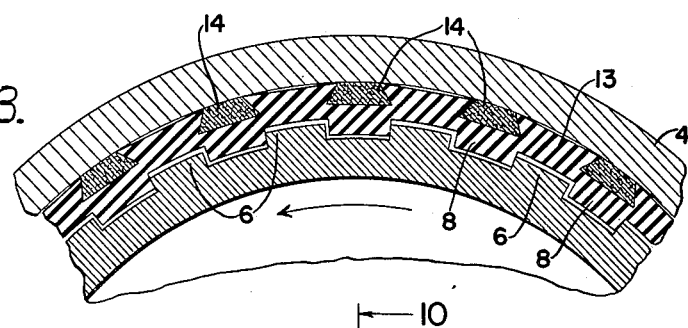
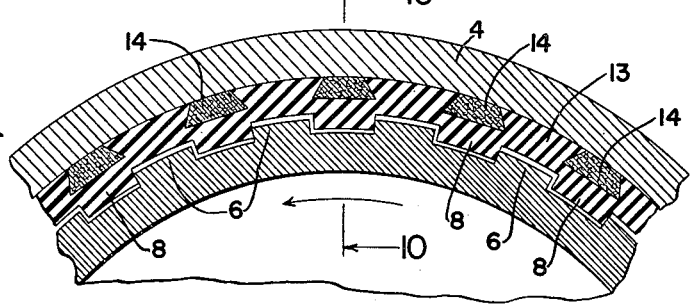
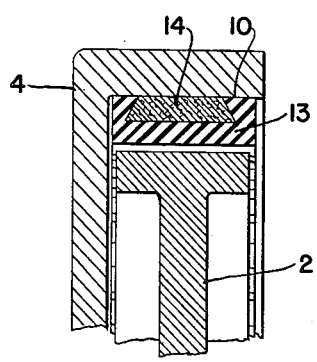
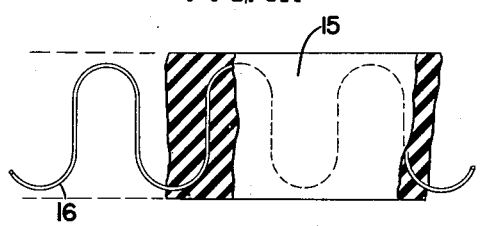

2,987,158
CENTRIFUGAL CLUTCH
Elmer C. Kiekhaefer, 343 S. Washington Ave., Cedarburg, Wis.
Original application Sept. 14, 1953, Ser. No. 379,879, now Patent No. 2,901,075, dated Aug. 25, 1959. Divided and this application Nov. 26, 1958, Ser. No. 776,487
2 Claims. (Cl. 192—105)

This invention relates to centrifugal clutches and particularly to the clutch element which provides the engagement and disengagement of the respective members of the clutch to effect the rotation of the shaft to be driven.

The invention provides a clutch element comprising a single band of flexible material which fits the teeth of the driving member and which, with rotation, is expanded by centrifugal force into radial engagement with the inner face of the outer drum member. The outer face of the clutch element or band is provided with wear-resistant material embedded within the band to protect the band against abrasion and wear and the resilience of the band allows compression of portions thereof in advance of each tooth of the driving member to provide a degree of self-energized clutch engagement.

An object of the invention is to increase the capacity and service of a centrifugal clutch subject to adverse conditions of operation and continuous slippage.

Another object is to provide means which will accommodate the flexing and lengthwise dimensional changes necessary to allow the band to expand and contract naturally into and out of engagement with the driven member.

Another object of the invention is to provide friction means which will engage the driven member and protect the material of the band against wear.

The drawings furnished herewith illustrate the best mode of carrying out the invention as presently contemplated and set forth hereinafter.

In the drawings:

FIGURE 1 is a longitudinal section through a clutch unit showing the band in section and disengaged;

FIG. 2 is an end elevation of the clutch unit shown in FIGURE 1 with part of the clutch broken away and sectioned;

FIG. 3 is a partial view similar to FIG. 2 showing the clutch band upon engagement with the driven drum member;

FIG. 4 is an enlarged view similar to FIG. 3 showing the deflection of the teeth of the clutch band by the torque load;

FIG. 5 is a diagrammatic illustration showing the fabric of the clutch band in the normal position as in FIG. 2;

FIG. 6 is a view similar to FIG. 5 showing the band in expanded position;

FIG. 7 is a plan view of the alternate embodiment of the invention with a part of the band broken away;

FIG. 8 is a sectional view showing a band as carried between the driven and driving members of the clutch and showing the operation of the frictional elements upon engagement with the driven clutch drum;

FIG. 9 is a view similar to FIG. 8 showing the clutch band in full engagement with the drum;

FIG. 10 is a transverse section taken on line 10—10 of of FIG. 9; and

FIG. 11 is a partially sectioned portion of the clutch band having a spring element providing improved operation over the conventional garter spring.

The clutch unit 1 shown in the drawings comprises the drive wheel 2 which is mounted on the drive shaft 3 within the drum 4. Drum 4 is fixed on the driven shaft 5 which is mounted in substantial alignment with the axis of shaft 3.

The outer periphery of wheel 2 is provided with a series of spaced projections or teeth 6 which extend the width of the wheel. The elastic clutch band 7 has a generally smooth outer surface and an inner surface having a series of corresponding projections or teeth 8 which extend across the inner face of the band and fit between the projections or teeth 6 of wheel 2. The clutch band 7 is mounted on wheel 2 within drum 4 so that in the normal position the outer surface 9 of band 7 is spaced from and free of contact with the inner face 10 of drum 4. The band 7 is of flexible elastic material so that when the drive wheel 2 and shaft 3 rotate at a given speed, centrifugal force will cause band 7 to expand into engagement with the inner surface 10 of drum 4. Teeth 6 of wheel 2 and the teeth 8 of band 7 remain in engaged relation and their faces may be angularly disposed to provide the desired tangential and radial components of thrust to drive the drum and effect the rotation of shaft 5.

The outer face of band 7 includes a layer of fabric 11 which is woven of various suitable materials capable of withstanding the abrasive action and heat developed by repeated engagement with the surface 10 of drum 4. The strands 12 of fabric 11 extend diagonally across the face of the band 7 so that the fabric will allow the band to expand with an increasing peripheral dimension for engagement with drum 4. The slight change in the width of the fabric which occurs corresponds to the same change which occurs in band 7 when the same expands into engagement with drum 4.

In the embodiment of the invention shown in FIGS. 7 through 11, the band 13 includes the clutch elements 14 which comprise rectangular pieces of friction material having champfered sides whereby each element is suitably embedded and secured in the body of the band with one face exposed outwardly to engage surface 10 of drum 4. Each element 14 is preferably also bonded to the material of the band 13 which may be of elastic material similar to that of band 7.

Each element 14 is comprised of sintered carbon or other suitable material usually having a density substantially greater than that of the material of band 13. In initial driving engagement of band 13 with the surface 10 of drum 4, the heavier elements 14 tend to pull the band radially outward while the natural resilience of the band tends to hold the band material between the elements under tension and from engagement with the drum. During the period of this condition, elements 14 serve to protect the material of band 13 against abrasion particularly in the initial period of clutch engagement while wheel 2 is bringing drum 4 up to speed. After drum 4 has reached a given speed and wheel 2 may have reached a similar speed, the band 13 expands into engagement with surface 9 of drum 4.

As the speed of wheel 2 increases and the centrifugal force acting on band 7 causes the portion of the band between elements 14 to be expanded into engagement with the face 10 of drum 4, the positive driving engagement of the band with the drum is effected.

Elements 14 serve to protect band 13 against wear and heat particularly during the period that the wheel is turning at a speed greater than that of drum 4.

In the embodiment of the invention shown in FIG. 11, the band 15 is similar to bands 7 and 13, for mounting on wheel 2 and driving drum 4. The wire 16, which is preferably continuous may extend within any of these bands 7, 13 or 15 and around the wheel and is of a weight which provides substantial centrifugal effect and increases the clutching capacity of the band. The configuration of the wire allows the band to expand for engagement with drum 4. Wire 16 comprises a series of opposite and alternately formed loops which extend entirely within the band to provide a configuration which allows the band to be expanded radially upon rotation.

Each band includes a series of teeth which are deflected as shown in FIG. 4 upon subjection to a shearing stress which causes localized compression of the rubber in advance of each tooth 6 of wheel 2. The tendency of the rubber to being squeezed between the outer ends of teeth 6 and the face of drum 4 by reason thereof is utilized according to the invention to provide the self-energizing of the clutch wherein the torque load effects a degree of the frictional engagement of the clutch band and drum.

This application is a division of a copending application which issued to Patent No. 2,901,075 on August 25, 1959.

Various modes of carrying out the invention are contemplated as being within the scope of the following claims particularly pointing out and distinctly claiming the subject matter which is regarded as the invention.

I claim:

1. In a centrifugal clutch, a driven drum, a driving wheel having a series of projecting teeth about the periphery thereof, a clutch band of molded elastic material mounted on said wheel and having a series of teeth corresponding to the teeth of said wheel, and a series of friction blocks embedded within the band at circumferentially spaced intervals about the outer periphery thereof, the outer face of said blocks being substantially flush with the outer periphery of said band and engageable with the driving face of the drum the density of said blocks being substantially greater than the material of said band whereby the blocks under the action of centrifugal force tend to engage the drum and bring the same up to speed before the material of the band between the blocks engages the drum, thereby reducing the abrasive action of the drum and the heat of the band.

2. In a centrifugal clutch, a driven drum, a rotatable drive wheel having a series of spaced teeth projecting outwardly about the periphery thereof and mounted coaxially within said drum, a clutch band of molded elastic material mounted on said wheel and having an outer periphery of generally constant radius and an inner periphery provided with a series of spaced teeth projecting inwardly and intermeshing with the teeth on said wheel for rotation therewith, the alternate portions of said band between the teeth thereof having substantially narrower radial extent and being expandable in response to centrifugal force, the elasticity of the band further providing for deflection of the teeth thereof in service, the last named teeth being compressed in advance of the teeth of the drive wheel to impose a radial component of thrust on the band to force portions of the outer periphery of said band opposite from the teeth thereof outwardly toward the driven drum and thereby provide a degree of self-energization of said clutch, and a plurality of friction blocks embedded within the outer periphery of said band, each of said blocks being disposed in radial alignment with a tooth of said band, said blocks having an exposed outer face generally flush with the outer periphery of said band and engageable with the driven drum by centrifugal force and deflection of the band, the density of said blocks being substantially greater than the material of said band whereby at a given speed of said wheel the band is partially expanded due to the centrifugal force acting on said blocks to intially place the blocks into engagement with the driven drum to bring the same up to speed while the band material between said blocks remains substantially out of contact with said drum, and thereafter at a somewhat higher given speed of said wheel and after the driven drum is substantially up to speed the band material between said blocks is further expanded into full contact with the drum due to the increased centrifugal force acting thereon.

References Cited in the file of this patent

UNITED STATES PATENTS

| 1,040,588 | Stromeyer | Oct. 8, 1912 |
| 1,226,769 | Hensley | May 22, 1917 |
| 2,283,325 | Fawick | May 19, 1942 |
| 2,367,048 | Pentz | Jan. 9, 1945 |
| 2,370,199 | Schuckers | Feb. 27, 1945 |
| 2,854,107 | Landrum | Sept. 30, 1958 |
| 2,867,102 | Williams | Jan. 6, 1959 |

FOREIGN PATENTS

| 393,852 | Germany | July 18, 1924 |
| 630,719 | Germany | May 14, 1936 |
| 348,823 | Italy | 1937 |
| 354,353 | Italy | Nov. 18, 1937 |